United States Patent [19]

Johnson et al.

[11] Patent Number: 4,814,755

[45] Date of Patent: Mar. 21, 1989

[54] INTERACTIVE DISPLAY SYSTEM

[75] Inventors: Peter W. Johnson, Winchester; Peter Quarendon, Romsey, both of United Kingdom

[73] Assignee: International Business Machines Corporation, Armonk, N.Y.

[21] Appl. No.: 82,978

[22] Filed: Aug. 4, 1987

Related U.S. Application Data

[63] Continuation of Ser. No. 714,643, Mar. 21, 1985, abandoned.

[30] Foreign Application Priority Data

Mar. 23, 1984 [EP] European Pat. Off. ........ 84301974.6

[51] Int. Cl.$^4$ .............................................. G09G 1/16
[52] U.S. Cl. .................................... 340/709; 340/747; 364/521
[58] Field of Search ............... 340/721, 747, 732, 739, 340/709, 710; 364/521, 518

[56] References Cited

U.S. PATENT DOCUMENTS

| Re. 31,200 | 4/0583 | Sukonick et al. | 340/709 |
|---|---|---|---|
| 4,412,296 | 10/1983 | Taylor | 364/521 |
| 4,492,956 | 1/1985 | Collmeyer et al. | 340/747 |
| 4,587,520 | 5/1986 | Astle | 340/710 |

OTHER PUBLICATIONS

Williams, Greg, "The Lisa Computer System", *Byte*, Feb. 1983, pp. 33–50.

W. M. Newman et al.: "Principles of Interactive Computer Graphics", 2nd Edition, 1981, pp. 63–68, Auckland McGraw-Hill, US, Chapter 5, pp. 65, 66; FIG. 5—5.

Computer Vision, Graphics and Image Processing, vol. 25, No. 3, Mar. 1984, pp. 383–392, New York, US: C. J. VanWyk: "Clipping to the Boundary of a Circular-Arc Polygon", p. 390, lines 8–18.

IBM Technical Disclosure Bulletin, vol. 18, No. 5, Oct. 1975, pp. 1593–1594, New York, US: P. L. Gardner: "Halving Algorithm for Correlating Pointing with a Vector", Figure; p. 1593.

Communications of the Association of Computing Machinery, vol. 26, No. 11, Nov. 1983, pp. 868–877, New York, US: You-Dong Liang et al.: "An Analysis and Algorithm for Polygon Clipping".

IBM Technical Disclosure Bulletin, vol. 26, No. 1A, Jun. 1981, pp. 235–236, New York, US: J. Simmons, et al.: "Polygon Filling in Graphics Display System".

*Primary Examiner*—John W. Caldwell, Sr.
*Assistant Examiner*—Alvin Oberley
*Attorney, Agent, or Firm*—Mark S. Walker; Frederick D. Poag

[57] ABSTRACT

A method for identifying a bounded area of a graphic display. The method uses the division of the display screen into nine areas then the central square is the correlation window. This window can be small, two or three pel width, or large if the application is seeking to identify a larger area. The point indicated by the operator is in the center of the correlation window. An object (bounded area) which intersects this square will register a bit. It can be seen that a bounded area will intersect the correlation window if either: (a) any part of the boundary actually passes through the window, or (b) any arbitrary point within the window is inside the area.

5 Claims, 6 Drawing Sheets

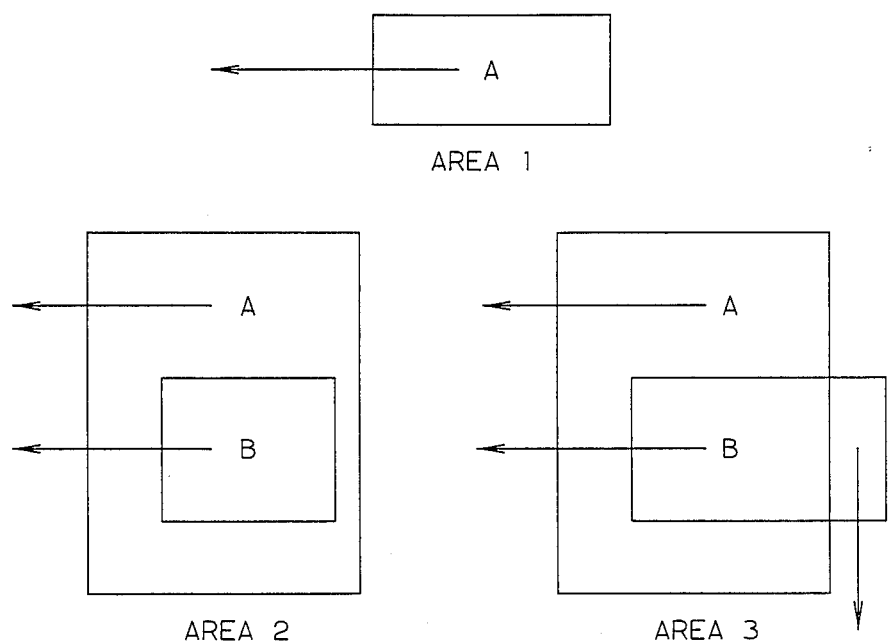

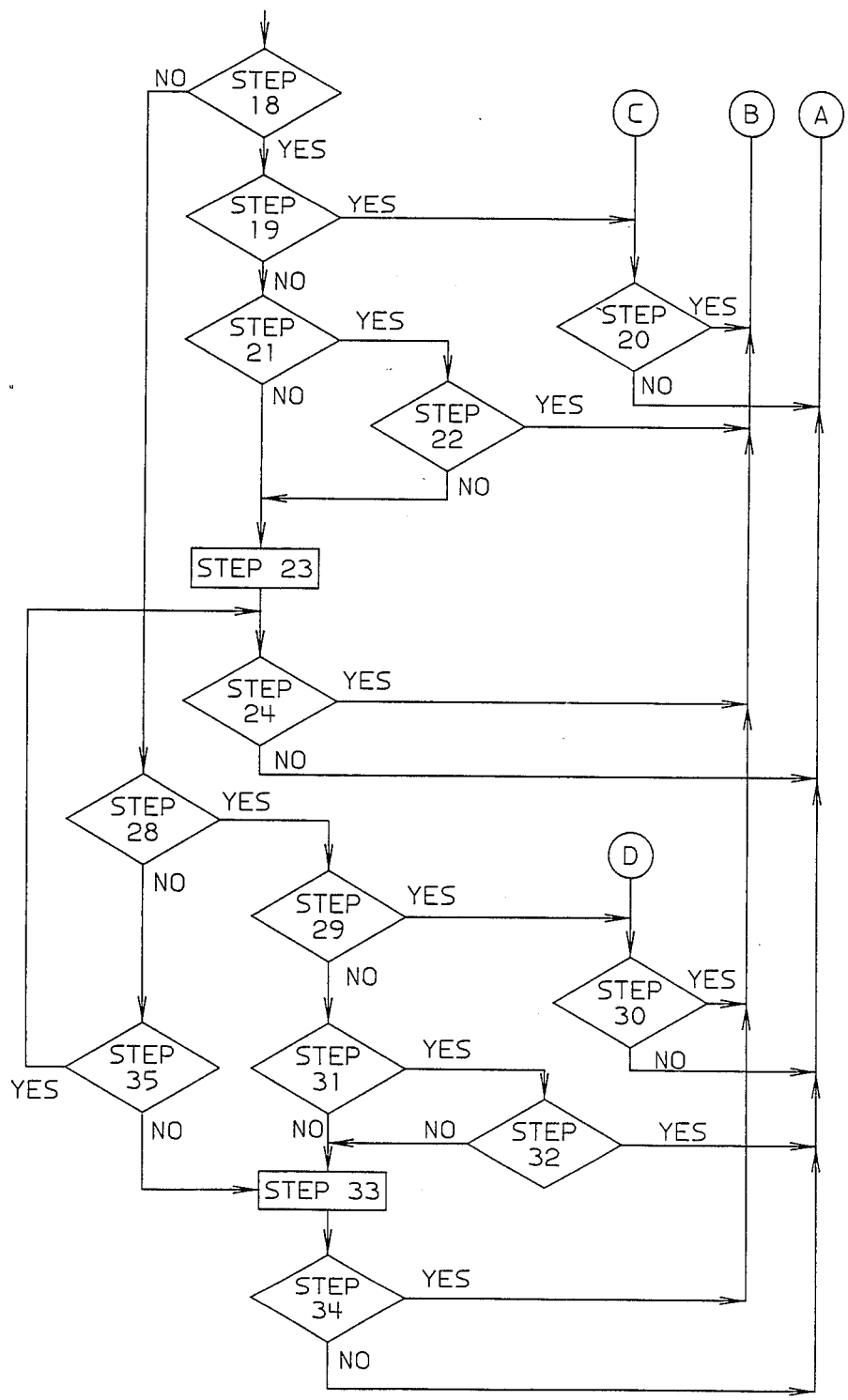

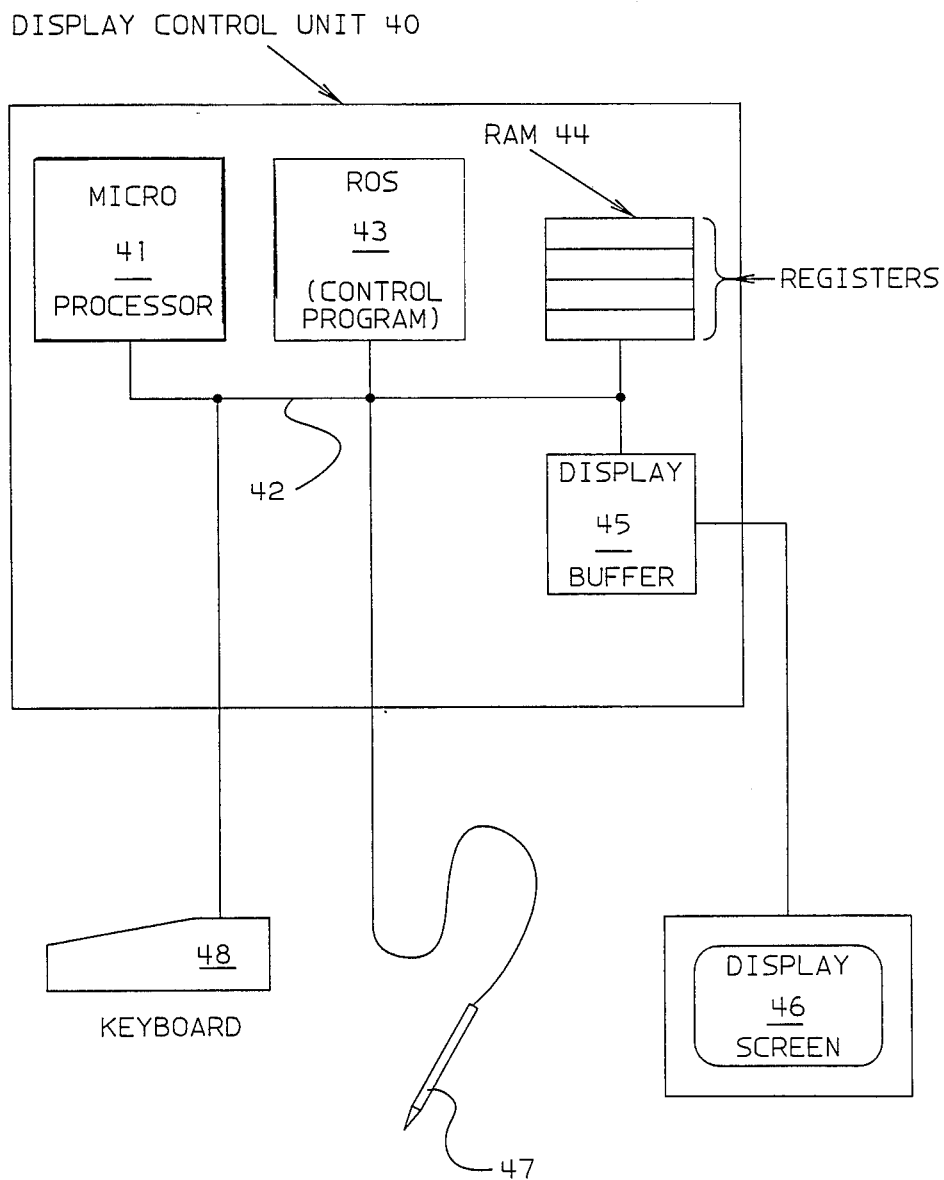

INTERACTIVE DISPLAY SYSTEM

This application is a continuation of application Ser. No. 06/714,643, filed Mar. 21, 1985, now abandoned.

BACKGROUND OF THE INVENTION

Field of the Invention

The present invention relates generally to improvements in interactive display systems and in particular to the identification of a bounded area in a graphic display system.

A common form of interaction with a graphic picture is for an operator to want to identify, to the application with which the operator is interacting, a particular object within the picture. This may be for one of a variety of reasons, for example to move the object in its relation to the other objects, modify or delete the object. A possible method of accomplishing this would be to identify the object by means of a command, e.g., DELETE BOLT 23. It is much more natural however for the operator to use a suitable device to actually point to the object. Typical devices are joystick, thumbwheel, trackball, or optical mouse coupled to a cursor in the display screen.

The immediate result of such a pointing is an (x, y) position on the screen. A correlation operation has then to be carried out to determine which of the objects in the picture actually passes through (or sufficiently close to) that point.

In order to do this a picture definition (display list) has to be scanned, just as if it were being drawn, but instead of actually drawing the objects defined in the list, they are each inspected to see whether they intersect a small square (for example) draw around the point of interest.

It is important that this process occurs quickly. The operator expects a rapid system response to indicate whether or not the pointing was successful. Since the operator has generally only pointed at one object out of the many in the picture, a critical performance factor is how quickly each of the remaining objects can be rejected.

Prior Art

A line clipping algorithm which divides each element of a picture into its visible and invisible portions is described in "Principles of Interactive Computer Graphics" by Newman and Sproull, 2nd Edition (1979) published by McGraw-Hill, Chapter 5, pp. 63–68. The algorithm described has two parts. The first determines whether the line lies entirely on the screen and if not it determines whether it can be trivially rejected as lying entirely off the screen. If the line satisfies neither test, then it is devided into two parts and the two tests applied to each part. The algorithm depends on the fact that every line either is entirely on the screen or can be divided so that one part can be trivially rejected.

SUMMARY OF THE INVENTION

The present invention is an extension of the method described in Newman and Sproull book and is concerned with how to carry out the correlation function if the object is a single bounded area. A feature of the method is that a large number of area boundary lines will rapidly be determined to be irrelevant.

According to the invention there is provided a method of identifying a displayed bounded area to a graphic display system comprising the steps of:
(a) defining a correlation window on the display screen.
(b) determining whether any part of the boundary of a bounded area passes through the window and
(c) determining whether an arbitrary point within the window is inside the bounded area.

BRIEF DESCRIPTION OF THE DRAWINGS

In order that the invention may be fully understood a preferred embodiment thereof will now be described with reference to the accompanying drawings in which:

FIG. 1 illustrates various bounded areas.

FIG. 2 illustrates the nine regions defined by a correlation window.

FIG. 4 is a block schematic of the apparatus used in implementing the preferred embodiment.

DEFINITION

Bounded Areas: A single bounded area is defined by one or more closed polygonal figures. In general, any such figure may intersect or include any other figure. The definition of whether any point lies inside or outside the resultant area is that it is inside if it is an odd number of boundary crossings from infinity.

This is illustrated in FIG. 1 which shows various bounded areas, each of which consists of one or more closed figures.

In each of the three areas, points A are an odd number of boundary crossing from infinity, and hence are inside the area. Points B are an even number, and hence outside. Rectangles have been used here for convenience, but the definition holds for closed figures of any shape.

GENERAL DESCRIPTION

The method of correlating on bounded areas is now described in general, a specific embodiment is described below with reference to FIGS. 3A and B. The general description will refer to the overall logic flow presented in FIG. 5 and to the more detailed flow presented in FIG. 6.

Figure 5:
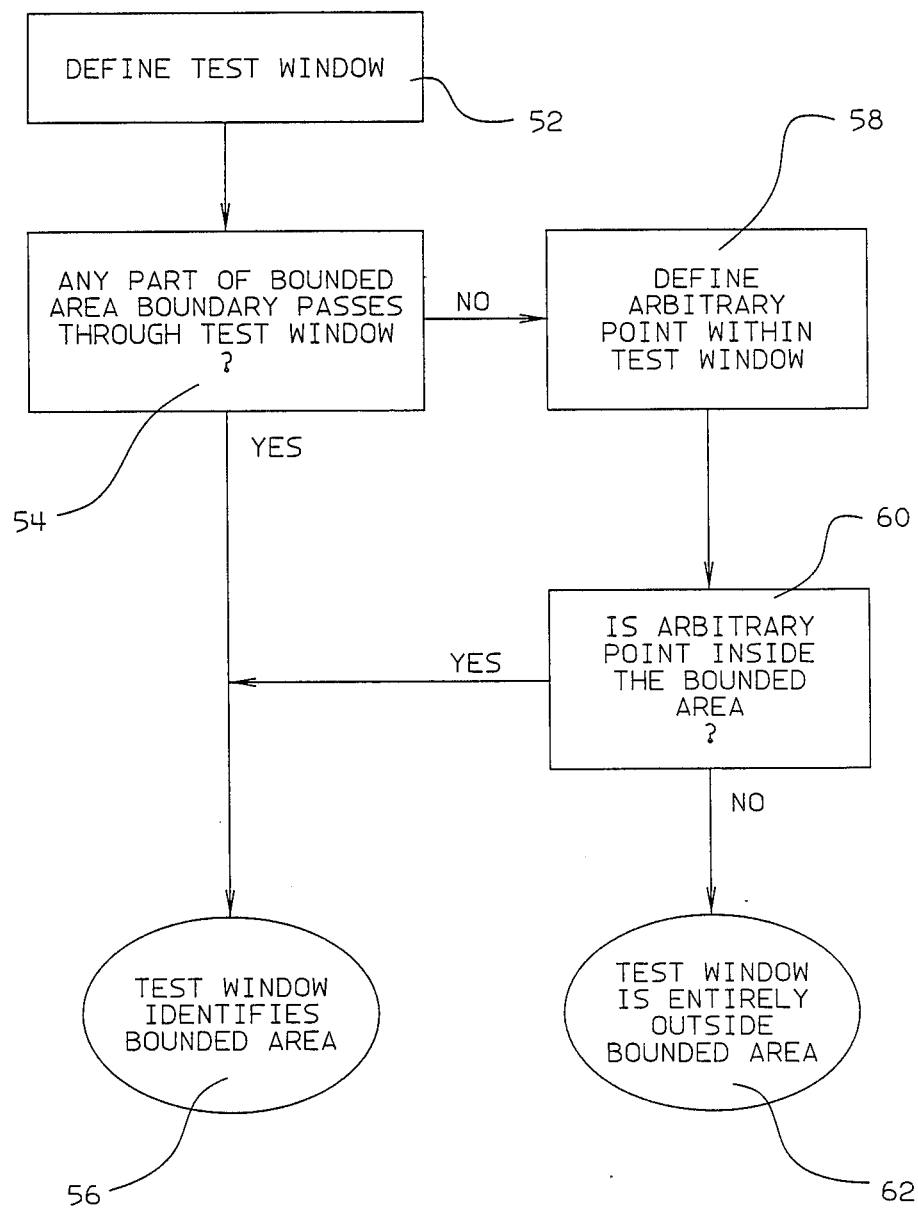
FIG. 5 is a flow chart representing an embodiment of the invention.
Figure 6:
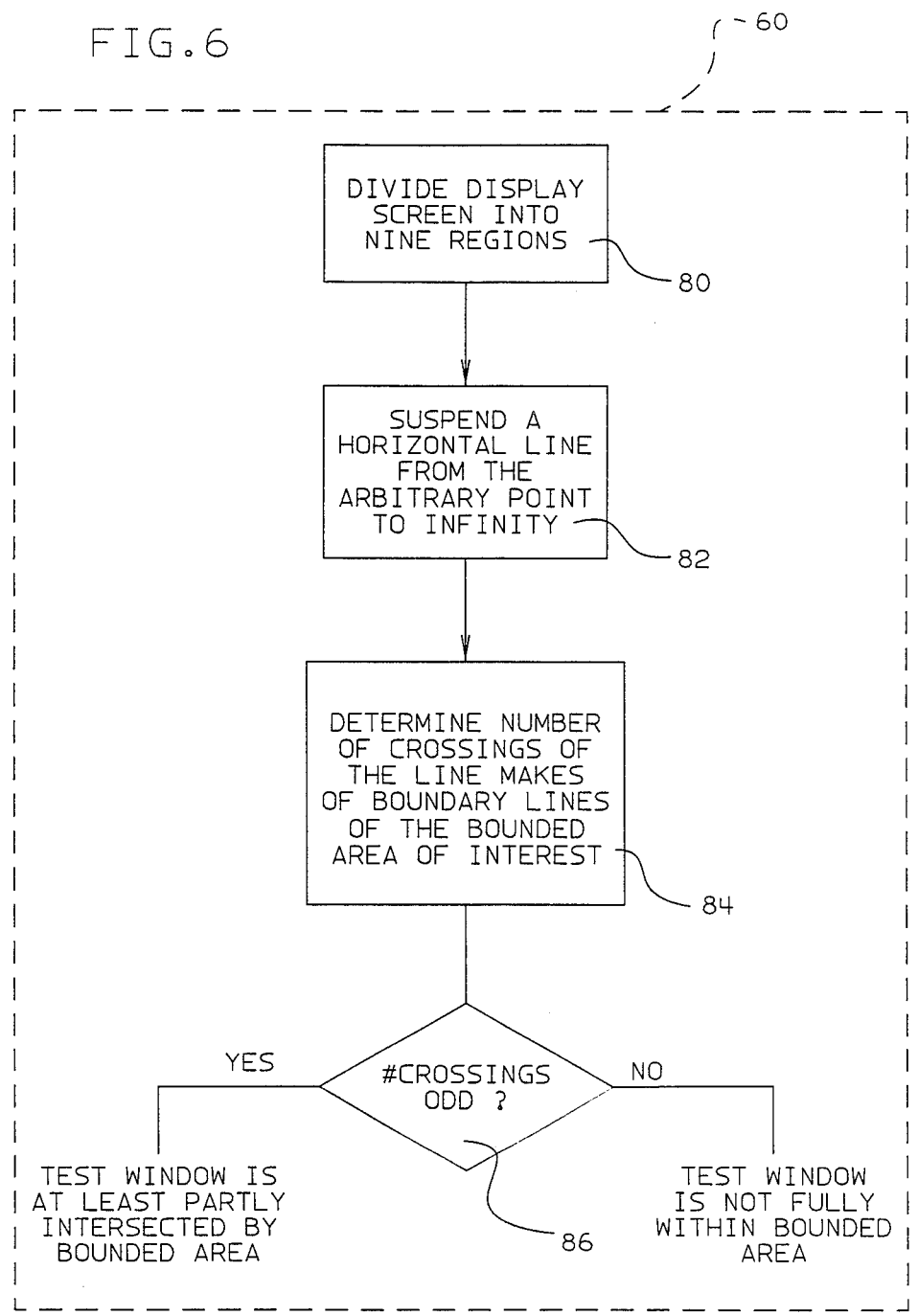
FIG. 6 is a flow chart representing further detail of an embodiment of the invention.

The 2-dimensional picture space is divided into 9 regions as is shown in FIG. 2, by the four lines L1, L2, L3 and L4 (FIG. 5 step 80). The small central square is the correlation window. The point indicated by the operator is at the center of this square (this defines the test window, step 52. Any object which intersects this square will register a 'hit'.

It can be seen that the bounded area being defined will intersect the correlation window (step 56) if either
1. Any part of the boundary actually passes through the window 54, or
2. Any arbitrary point within the window is inside the area 60.

If neither test is satisfied, the window is outside the bounded area (step 62).

The method 54 used for the detection of the first of these conditions is Newman and Sproull's four-bit algorithm (note that this definition will acutally cause an infinitely thin area, which may not even be visible, to be selectable). The method 60 used for the second condition will now be described.

In the description which follows, the top left corner of the window has been arbitrarily chosen for testing the second condition 58. In order to apply this test, imagine scanning along the horizontal left-to-right line from infinity to the top left corner point (line L5) 82. Each time a boundary line is crossed, the state flips between being inside and outside the area 84. Thus when the corner of the correlation window is reached, if an odd number of lines have been crossed we are inside the area, and if an even number (including zero) have been crossed, we are outside it 86.

An immediate consequence of this is that all boundary lines which are:
wholly above L3, or
wholly below L4, or
wholly to the right of L2,
can have no effect on the area state in the correlation window. Any such lines (which can be readily recognized by means of the four-bit codes) can therefore be immediately discarded as irrelevant. This quick rejection is an important feature of the method being described.

Furthermore, the slope and actual x position of any lines within the region whose region code is '0001'B are not important (except to deduce whether or not they actually pass through the correlation window itself); the only relevant information is whether these lines actually cross line L5.

This information is recorded very simply by keeping an indicator bit. This bit is initialized to zero at the start of an area description, and, whenever a boundary line is detected which crosses line L5, it is flipped (by performing an exclusive-OR operation with a one bit). When the area definition is complete, if the indicator bit is non-zero, condition 2 is satisfied, and the area does intersect the correlation window.

As each boundary is processed, the following takes place:

1. The endpoints are tested to see which of the 9 regions each lies in, and the appropriate four-bit code for each is determined. (For continuation lines, the start code will already have been calculated as the end point of the previous line.) Let the two codes be C1 and C2.

2. If C1 and C2 and '1110'B≠'000'B, then this line is irrelevant, and may be discarded. The line lies either
wholly above L3, or
wholly below L4, or
wholly to the right of L2.

A large number of lines will be trivially rejected in this way.

3. If C1 or C2='1100'B or '0011'B, then this is a near-vertical or near horizontal line passing through the correlation window. This area can therefore immediately be designated as a 'hit', and further processing of it (including any subsequent boundary lines) may be bypassed.

4. If C1='0000'B, or C2='0000'B, then this line has an endpoint in the correlation window. Again, the area can now be immediately designated as a hit, and further processing bypassed.

5. If C1 and C2='0001'B, then the line lies to the left of line L1 in FIG. 2. The line definitely does not pass through the correlation window; but some part of its does lie within the region having a bit-code of '0001'B.

If C1|C2='1...'B, then it also crosses the line L5, and the indicator bit must be flipped.

6. Any remaining lines may intersect the correlation window. If the lines were actually being plotted, it would be necessary to calculate the coordinates of the point where the line intersects one of the lines defining the window. To determine whether or not it crosses the window, however, it is only necessary to compare the slope of the actual line with the slope of a line drawn from one of the endpoints to the critical corner of the correlation window. (In some cases, i.e. where the endpoints are in diagonally opposite regions, more than one such comparison may be necessary.) If this shows the line does in fact pass through the correlation window, then the area is a 'hit', and further processing may be bypassed.

During these tests it will emerge whether or not the line actually crosses line L5. If it does, the indicator bit must be flipped.

DETAILED EMBODIMENT

Figure 3A:
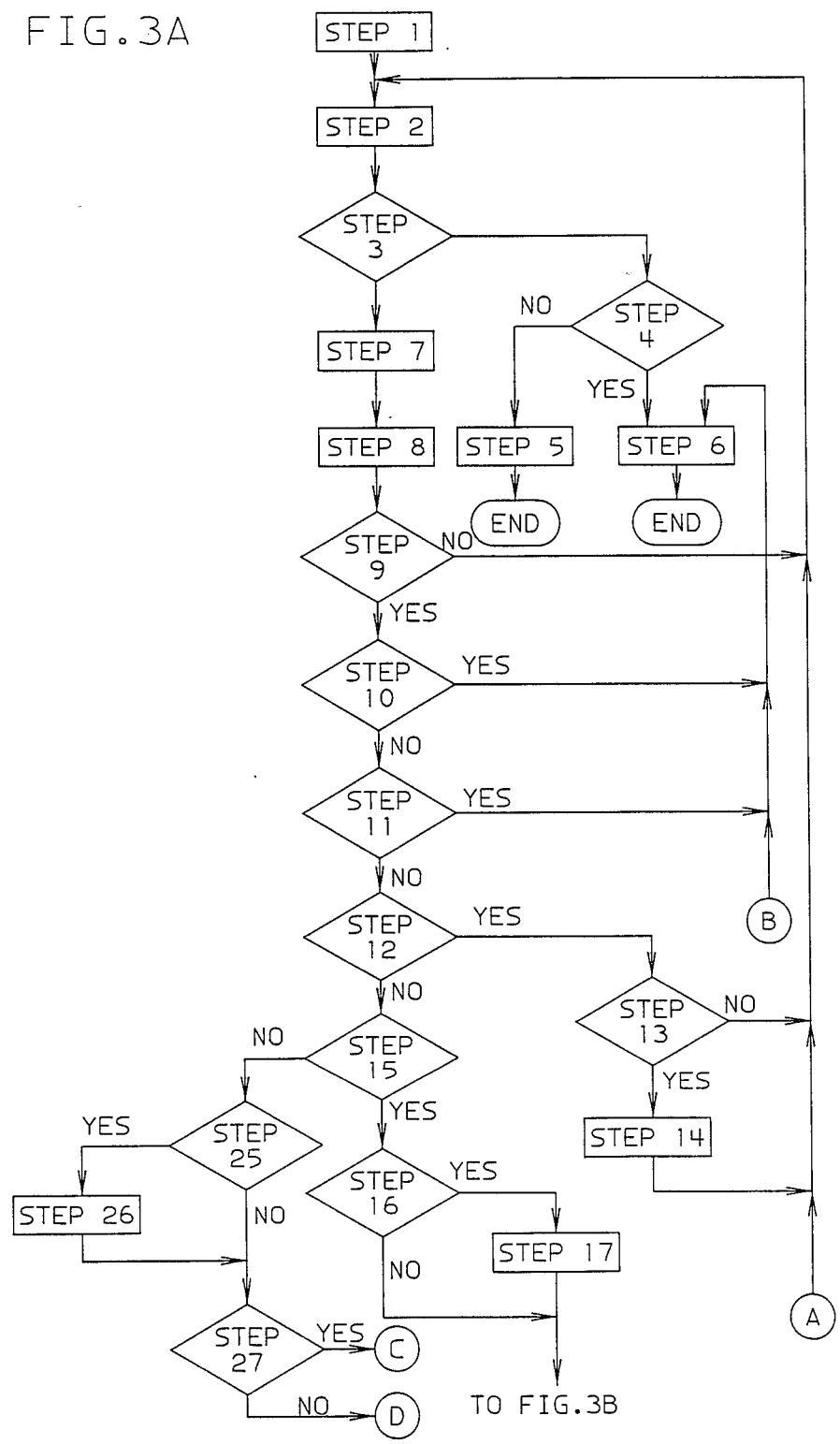
FIGS. 3A and B further show a flow chart of the preferred method of implementing the invention.

FIGS. 3A and B together show the steps in the preferred method of implementing the invention. The data display system in which the method is implemented is required to include the following registers:

Register $x_1y_1$ to hold the x and y coordinates of one of the line.

Register $x_2y_2$ to hold the x and y coordinates of the other end of the line.

Register $c_1c_2$ to hold the four bit codes of both ends of the line.

Register code to hold a single bit (the "indicator" bit).

Register $x_Rx_Ly_Ty_B$ holds the coordinate values of the corner
points of the bounded area
$x_R$=x right
$x_L$=x left
$y_T$=y top
$y_B$=y bottom.

It should be noted that the calculation of the four-bit codes is not described. This is straight forward and well known in the art.

It should also be realized that the code for one end point of a line will normally be computed as one end point of the previous line.

In the following description it is assumed that the system is initialized so that the first time the step 'Get next line' is executed, the first line will be processed.

The sequence of the steps of the method is illustrated in FIG. 3, the step numbers corresponding to the numerals on the flow chart symbols.

Step 1 Set the code register='0'B

Step 2 Get the next line.

Step 3 Determine whether there is a line or not. If not, go to Step 4. If there is a line go to Step 7.

Step 4 Determine whether the code register is set to '1'B. If not, then go to Step 5. If yes, then go to Step 6.

Step 5 The total area which has been examined is not a total "hit"—End process.

Step 6 The total area which as been examined is a "hit" End process.

Step 7 Registers $x_1y_1$ and $x_2y_2$ are set with the line end points.

Step 8 The four bits codes $c_1$ and $c_2$ are computed for the ends of the line and stored in the Register $c_1c_2$.

Step 9 Determine the logical function whether $c_1$ AND $c_2$ AND '1110'B='0000'B. If not return to Step 2. If yes then continue at Step 10.

Step 10 Determine whether $c_1$ OR $c_2$='1100'B OR $c_1$ OR $c_2$='0011'B. If yes return to Step 6. If no continue to Step 11.

Step 11 Determine whether $c_1$='0000'B or $c_2$='0000'B
If yes then return to Step 6.
If not then continue at Step 12.

Step 12 Determine whether $c_1$ AND $c_2$='0001'B
If yes then to to Step 13
If no continue at Step 15

Step 13 Determine whether $c_1$ OR $c_2$ gives '1XXX'B
If no return to Step 2
If yes continue at Step 14.

Step 14 Flip the code bit in the code register. Return to Step 2.

Step 15 Determine whether $c_1$ OR $c_2$ gives 'XXX1'B
If no go to Step 25
If yes continue at Step 16.

Step 16 Determine whether $c_2$='XXX1'B
If yes go to Step 17
If no continue at Step 18.

Step 17 Swap $c_1$ and $c_2$ Swap contents of Register $x_1 y_1$ and $x_2 y_2$ Continue at Step 18.

Step 18 Determine whether $c_1$='1001'B
If no continue at Step 28
If yes continue at Step 19.

Step 19 Determine whether $c_2$='0010'B
If yes go to Step 20
If no continue at Step 21

Step 20 This step is to determine whether the line having end points codes in the areas '1001'B and '0010'B (or '1000'B and either '0010'B or '0010'B) passes above, through below the top right corner of bounded area. This is done by comparing the slope of the line with the slope of a line drawn from the end point having $c_1$ '1001'B to the top right corner having a y coordinate=$y_T$. The comparison $$\left(\frac{y_1 - y_2}{x_2 - x_1}\right) \geqq \left(\frac{y_1 - y_T}{x_R - x_1}\right)$$

is made.
If yes return to Step 6
If no return to Step 2.

Step 21 Determine whether $c_2$='0110'B
If yes go to Step 22
If no continue at Step 23.

Step 22 This step is to determine whether a line having end points codes in the areas '1001'B and '0110'B passes above, through or below the top right corner.
The comparison $$\left(\frac{y_1 - y_2}{x_2 = x_1}\right) \geqq \left(\frac{y_1 - y_T}{x_R - x_1}\right)$$

is made.
If yes continue at Step 23
If no return to Step 2.

Step 23 Flip the code bit in the code register.
Step 24 this step is to determine whether a line having end points codes in the areas '1001'B (or '0001'B) and '0110'B passes above, through or below the bottom left corner of the bounded area. The comparison $$\left(\frac{y_1 - y_2}{x_2 - x_1}\right) \leqq \left(\frac{y - y_B}{x_L - x_1}\right)$$

is made.
If yes return to Step 2
If no return to Step 2.

Step 25 Determine whether $c_1$='XX1X'B
If yes go to Step 26
If no continue at Step 27.

Step 26 Swap $c_1$ with $c_2$ Swap contents of Register $x_1 y_1$ with contents of register $x_2 y_2$. Continue at Step 27.

Step 27 Determine whether $c_1$='1000'B
If yes return to Step 20
If no go to Step 30.

Step 28 Determine whether $c_1$='0101'B
If yes go to Step 29
If no continue at step 35.

Step 29 Determine whether $c_2$='0010'B
If yes go to Step 30
If no continue at Step 31.

Step 30 This step is to determine whether a line having end point codes in the areas '0101'B and '0010'B passes above, through or below the bottom right corner of the bounded area. The comparison $$\left(\frac{y_2 - y_1}{x_2 - x_1}\right) \geqq \left(\frac{y_B - y_1}{x_R - x_1}\right)$$

is made.
If yes return to Step 6
If no return to Step 2.

Step 31 Determine whether $c_2$='1010'B
If yes go to Step 32
If no continue at Step 33.

Step 32 This step is to determine whether a line having end point codes in the areas '0101'B and '1010'B passes through or below the bottom right corner of the bounded area. The comparison $$\left(\frac{y_2 - y_1}{x_2 - x_1}\right) \geqq \left(\frac{y_B - y_1}{x_R - x_1}\right)$$

is made.
If yes continue at Step 33
If no return to Step 2.

Step 33 Flip the code bit in the code register.
Step 34 This step is to determine whether a line having end point codes in the areas '0101'B (or '0001'B) and '1010'B passes above, through or below the top left corner of the bounded area. The comparison $$\left(\frac{y_2 - y_1}{x_2 - x_1}\right) \leqq \left(\frac{y_T - y_1}{x_L - x_1}\right)$$

is made.
If yes return to Step 6
If no return to Step 2.

Step 35 Determine whether $c_2=$ 'X1XX'B
If yes return to Step 24
If no return to Step 33.

FIG. 4 shows in block schematic form the apparatus in which the method described above can be implemented. A display control unit 40 contains a microprocessor 41 connected through a bus 42 to a read only store 43 which contains the control progam for controlling the operations as set out with reference to FIG. 3. A random access store 44 has areas designated as registers $x_1y_1:x_2y_2$ $c_1c_2:x_Lx_R$, $y_Ty_B$:and a code bit. A display buffer 45 holds the raster information for the display screen 45. A light pen 47 and a Keyboard 48 are connected through input ports to the bus 42.

It should also be noted that although the embodiment described above is implemented in the display controller in some applications it may be convenient to implement the invention in a host processor and the control program can be implemented as microcode in the read only memory implementation in a purpose built LS1 chip.

We claim:

1. A method for identifying a display bounded area to a graphic display system, wherein at least part of said bounded area may be shown on a display screen of said system, comprising the steps of:
    (a) defining a window on said display screen for testing for correlation of a portion of the screen to said bounded area,
    (b) determining whether any part of the boundary of said bounded area passes through the window,
    (c) defining an arbitrary point within said window, and
    (d) determining whether said arbitrary point is inside said bounded area, and identifying the bounded area as partially, or wholly within said correlation window when said arbitrary point is inside said bounded area, wherein step (d) includes the steps of:
    (e) dividing the display screen into nine regions including and centered on the correlation window,
    (f) suspending a horizontal line from said arbitrary point to infinity.
    (g) determining whether the number of crossing the horizontal line makes with the boundary lines of said bounded area is even or odd and determining when an area definition is complete and said number of crossings is odd that the that the bounded area intersects the correlation window.

2. A method as claimed in claim 1 including an initial step of centering the correlation window about a point on said display screen indicated by an operator using a cursor movement device, and in which step (g) is accomplished by setting an indicator bit to zero and changing its state whenever said boundary line is detected crossing said horizontal line.

3. An interactive graphic display system including first control means to define a correlation window on the display screen, processing means controlled to determine whether any part of the boundary of a bounded area passes through the window, to determine whether an arbitrary point within the window is inside the boundary area and to divide the display screen into nine regions centered on the correlation window, and suspend a horizontal line from the arbitrary point to infinity and determine the number of crossings and horizontal line makes with the boundary lines of each area.

4. An interactive display system including a display buffer for storing information relating to vectors displayed on a display screen, indicator means to allow a user to indicate locations on the display screen and a bounded area correlation mechanism arranged to detect and indicate location and determine which displayed vectors at least partially bound a bounded area surrounding the indicated location, said mechanism being controlled to construct a correlation window around the indicated location, to divide the rest of the display screen into out-regions and to extend a line from the correlation window to the edge of the display screen, and to determine whether vectors currently displayed on the screen lie wholly above, wholly below or wholly to one side of the correlation window without crossing the extended line and to further process only those bounded areas which include vectors that pass through the correlation window or have boundary vectors which have an odd number of total crossings of the extended one.

5. A method according to claim 1, wherein step (b) includes, the step of testing a boundary line of said bounded area for trivial rejection which comprises comparing the slope thereof to a line from a point thereon to a corner of said window to determine if the line must pass clear of said window.

* * * * *